United States Patent
Adams et al.

(10) Patent No.: US 6,587,158 B1
(45) Date of Patent: Jul. 1, 2003

(54) METHOD AND APPARATUS FOR REDUCING ON-CHIP MEMORY IN VERTICAL VIDEO PROCESSING

(75) Inventors: Dale R. Adams, San Jose, CA (US); Laurence A. Thompson, Saratoga, CA (US); Jano D. Banks, Cupertino, CA (US)

(73) Assignee: DVDO, Inc., Campbell, CA (US)

( * ) Notice: Subject to any disclaimer, the term of this patent is extended or adjusted under 35 U.S.C. 154(b) by 0 days.

(21) Appl. No.: 09/359,530

(22) Filed: Jul. 22, 1999

Related U.S. Application Data
(60) Provisional application No. 60/093,815, filed on Jul. 23, 1998.

(51) Int. Cl.[7] .................................................. H04N 9/64
(52) U.S. Cl. ........................ 348/716; 348/715; 348/714; 348/206; 345/543; 345/545; 345/547
(58) Field of Search ................................. 348/716, 715, 348/714, 717, 718, 719, 720, 206, 442, 488, 466, 458, 487; 345/530, 536, 537, 545, 547, 560, 558, 543; 711/5; H04N 9/64

(56) References Cited

U.S. PATENT DOCUMENTS

| | | | | |
|---|---|---|---|---|
| 5,287,183 A | * | 2/1994 | Thomas et al. | 348/571 |
| 5,428,397 A | * | 6/1995 | Lee et al. | 348/448 |
| 5,485,216 A | * | 1/1996 | Lee | 348/441 |
| 5,550,591 A | * | 8/1996 | Rim et al. | 348/699 |
| 5,559,953 A | * | 9/1996 | Seiler et al. | 345/532 |
| 5,774,110 A | * | 6/1998 | Edelson | 345/601 |
| 5,889,562 A | * | 3/1999 | Pau | 348/447 |
| 5,946,037 A | * | 8/1999 | Ahnn | 375/240.01 |
| 6,097,438 A | * | 8/2000 | Nagakubo et al. | 348/441 |
| 6,157,739 A | * | 12/2000 | Yazawa et al. | 348/445 |
| 6,195,131 B1 | * | 2/2001 | Kaneko | 348/561 |
| 6,195,414 B1 | * | 2/2001 | Simmons et al. | 375/225 |
| 6,229,571 B1 | * | 5/2001 | Sato | 348/446 |
| 6,259,479 B1 | * | 7/2001 | Gadre et al. | 348/441 |
| 6,281,873 B1 | * | 8/2001 | Oakley | 345/418 |
| 6,301,299 B1 | * | 10/2001 | Sita et al. | 348/714 |
| 6,359,660 B1 | * | 3/2002 | Matsuo et al. | 348/441 |

* cited by examiner

*Primary Examiner*—John Miller
*Assistant Examiner*—Linus H. Lo
(74) *Attorney, Agent, or Firm*—Perkins Coie LLP

(57) ABSTRACT

A digital image processor includes an input buffer for storing raster-scanned data. A slice-buffer memory is coupled to the input buffer to store a portion of a vertical slice of said raster-scanned data. The vertical slice is processed by a vertical slice processor having an input coupled to the slice-buffer memory. The vertical slice processor reassembles the vertical slices into processed raster-scanned data in an output buffer that is coupled to the output of the vertical slice processor. The digital image processor preferably utilizes multiple sequential processing stages and processes the raster-scanned data along the horizontal axis of the vertical slices.

15 Claims, 8 Drawing Sheets

METHOD AND APPARATUS FOR REDUCING ON-CHIP MEMORY IN VERTICAL VIDEO PROCESSING

CROSS REFERENCE TO RELATED APPLICATIONS

This application claims the benefits of co-pending U.S. Patent Provisional Application No. 60/093,815 filed on Jul. 23, 1998, and is related to U.S. patent application Ser. No. 09/167,527 filed on Oct. 6, 1998, both of which are incorporated herein by reference.

BACKGROUND OF THE INVENTION

1. Field of the Invention

The present invention relates generally to video processing and, more particularly, to techniques for vertical processing of horizontally scanned video images.

2. Description of the Related Art

FIG. 1 shows an illustration of a rectangular picture area 10 with a horizontal full row scanning sequence. The rectangular picture area 10 is divided into a number of rows of data 12 which are scanned from left to right, with rows being traversed from the top of the image to the bottom. Video data is generally produced in this type of horizontal raster-scanned format. Video data is also provided in this fashion from a wide variety of data sources (e.g., broadcast, video tape, video disc) and used in the same sequence for display purposes (e.g., television, computer monitors, LCD displays).

FIG. 2 is a diagram of a prior art video processor 14, which processes video data before displaying or storing the data. The video processor 14 typically receives data 16 in a raster-scan format. The video processor 14 must deliver the processed video data 18 in the same or similar format. Examples of common types of processing include image size reduction/enlargement (or "scaling"), filtering to remove high frequencies, filtering to enhance detail in the image, or format conversion from one video data type to another (e.g., deinterlacing).

Many types of processing only utilize data from horizontally adjacent pixel locations. This naturally fits with the existing data ordering of the raster-scanned format and is relatively economical to implement. In addition, the row ordering of the video data naturally aligns with the current dynamic random access memory (DRAM) row/column chip organization which provides significantly reduced access times for in-row (or horizontal) accesses.

However, when video data must be processed in the vertical direction, particularly when multiple vertically adjacent pixel locations are simultaneously needed for processing, the raster-scanned format no longer provides the data needed in the correct or appropriate order. FIG. 3 is a diagram of a horizontal raster-scanned video image 20 divided into a number of scan lines 22 and pixels 24. In order to vertically process the data, multiple pixels are needed which come from different scan lines 22.

Since the pixel data is presented in a horizontally ordered sequence, multiple lines of video data must be available in order to have simultaneous access to multiple vertically aligned pixels. This requires storing or buffering of those multiple lines in order to make the data available for processing. In the past, this has either not been done at all due to implementation cost reasons, or has been done by using multiple on-chip line memories to store a number of horizontal lines of pixel data. If nothing is done, the result is nonexistent or poor quality processing due to lack of vertical pixel data being available.

The main problem with using on-chip line memories for vertical processing of horizontal raster-scanned video is that they are extremely large, thus requiring a significant increase in die area (and therefore chip cost). This is particularly true if a large number of line memories are needed for high-quality processing. A single line memory for the ITU-R BT.601 standard digital video formats typically contains 720 16-bit pixels, or 11520 memory bits.

Because multiple line memories are needed for quality vertical processing, and since some video processing implementations require multiple serial processing stages, each with its own set of line memories, the required amount of on-chip memory can be very large in many different scenarios. For instance, with 6 line memories per processing stage, and with 3 serial processing stages the number of required memory bits would be over 200 kbits.

External memories have not been often utilized due to the fact that accessing vertically adjacent data results in the crossing of DRAM row (or page) boundaries, with the attendant severe reduction in available memory bandwidth. The implementation cost issue is compounded by the fact that high quality processing typically requires more data, i.e., better vertical processing requires a larger number of simultaneously available vertically aligned pixels.

On-chip memory requirements of this order significantly reduce the available implementation options (e.g., prototyping with field programmable gate arrays (FPGA) or most gate-arrays is not viable) and increase the chip die area and cost. While these expensive line memories for vertical video processing cannot be eliminated completely, any reduction of the memory requirements would be valuable.

In view of the foregoing, it is desirable to have a method that provides for high quality vertical processing of horizontally scanned video while minimizing cost and reducing the number of full line memories required.

SUMMARY OF THE INVENTION

The present invention fills these needs by providing an efficient and economical method and apparatus for high quality vertical video processing utilizing off-chip commodity memory and an alternative scan sequence for vertical processing. It should be appreciated that the present invention can be implemented in numerous ways, including as a process, an apparatus, a system, a device or a method. Several inventive embodiments of the present invention are described below.

In one embodiment of the present invention, a digital image processor is provided. The digital image processor includes an input buffer for storing raster-scanned data. A slice-buffer memory is coupled to the input buffer to store a portion of a vertical slice of said raster-scanned data. The vertical slice is processed by a vertical slice processor having an input coupled to the slice-buffer memory. The vertical slice processor reassembles the vertical slices into processed raster-scanned data in an output buffer that is coupled to the output of the vertical slice processor. The digital image processor preferably utilizes multiple sequential processing stages and processes the raster-scanned data along the horizontal axis of the vertical slices.

In another embodiment of the present invention, a method of processing image data is provided. The method includes buffering a block of raster-scanned data in an input buffer. Vertical slices of the raster-scanned data are sequentially retrieved and processed, forming processed vertical slices.

The processed vertical slices are then stored in an output buffer to form a processed block of raster-scanned data. The vertical slices are preferably comprised of a slice core and at least one pair of wings, which overlap the slice core of horizontally adjacent vertical slices. The width of the processed block of raster-scanned data is preferably equal to the width of the slice core.

An advantage of the present invention is that the on-chip memory requirements for high quality vertical processing are significantly reduced. By dividing the rectangular video field or frame into smaller portions, the memory requirements of the system can be reduced by an order of magnitude. Therefore, the image processing chip is not limited by the constraints of having only a small number of on-chip line memories. In addition, by not having to use the line memories, costs are dramatically reduced.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION OF THE PREFERRED EMBODIMENTS

An invention for a method and apparatus for reducing on-chip memory in vertical video processing is disclosed. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 1:
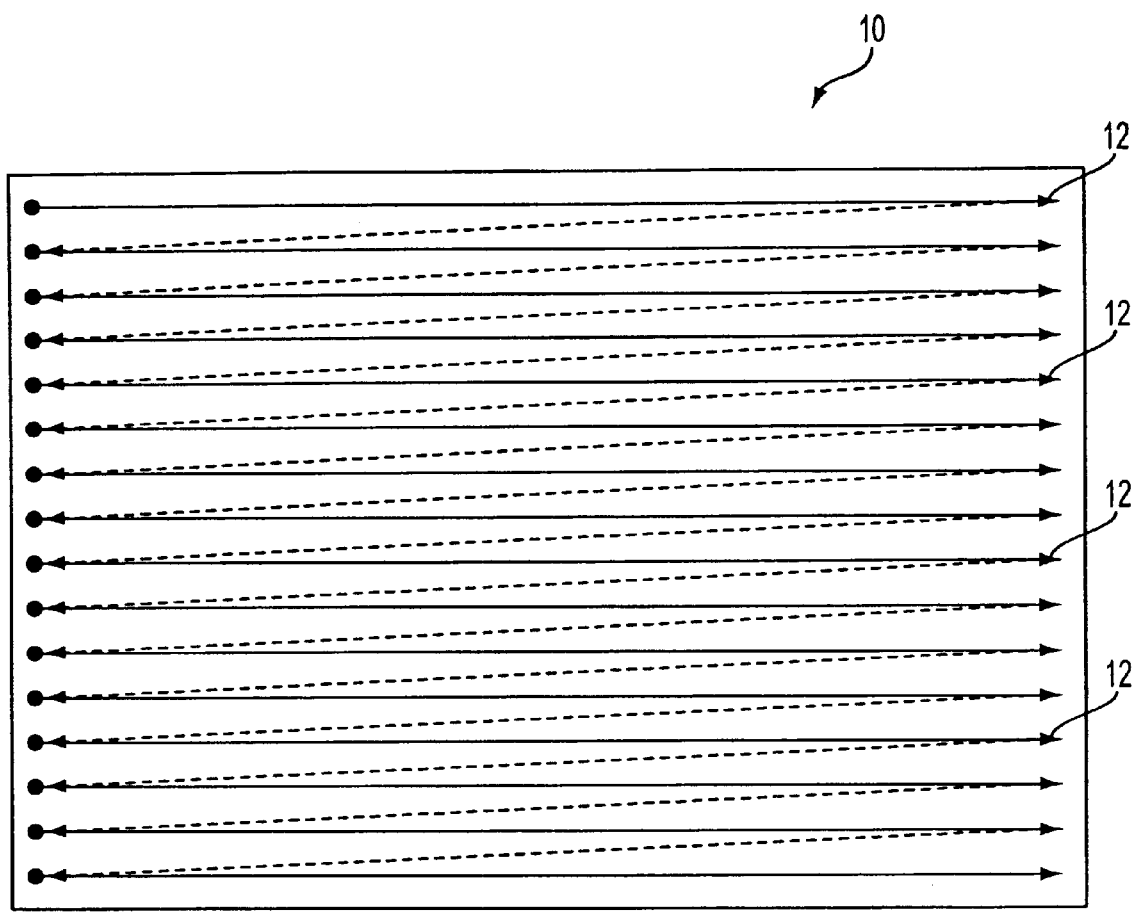
FIG. 1 illustrates a rectangular picture area with a full row scanning sequence of the prior art.
Figure 2:
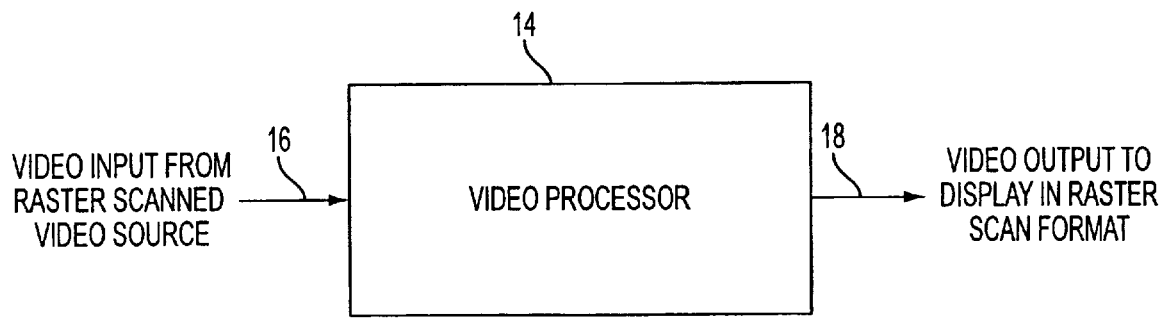
FIG. 2 is a diagram of a prior art video processor.
Figure 3:
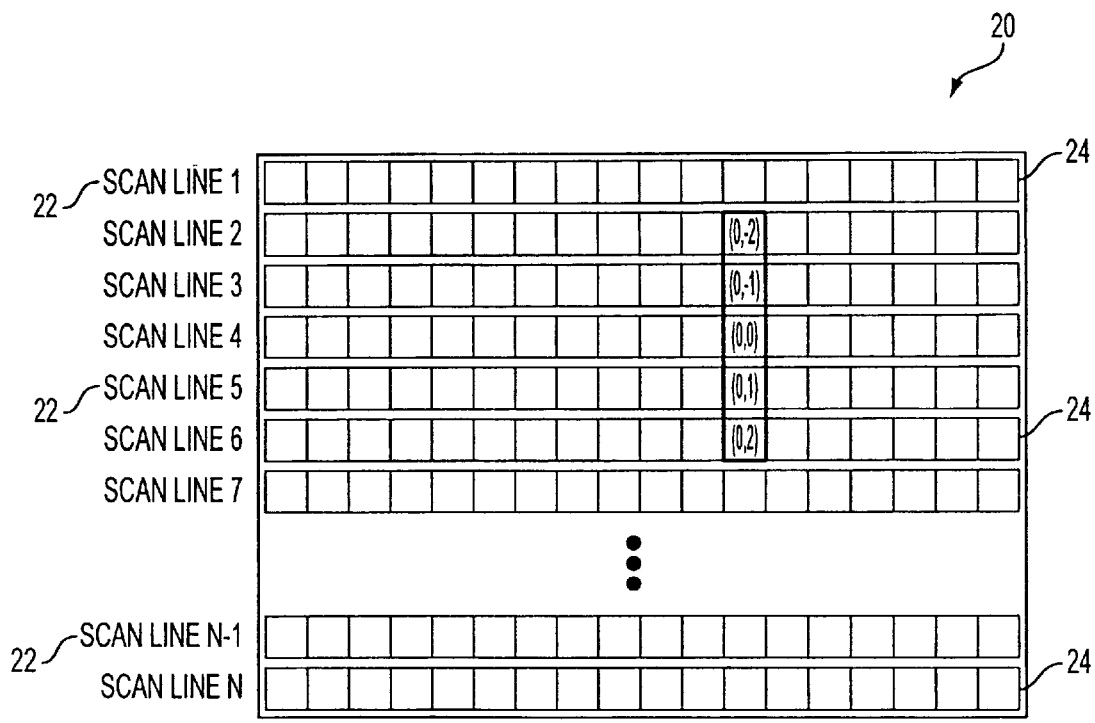
FIG. 3 is a diagram of a prior art horizontal raster-scanned video image divided into a number of scan lines and pixels.
Figure 4:
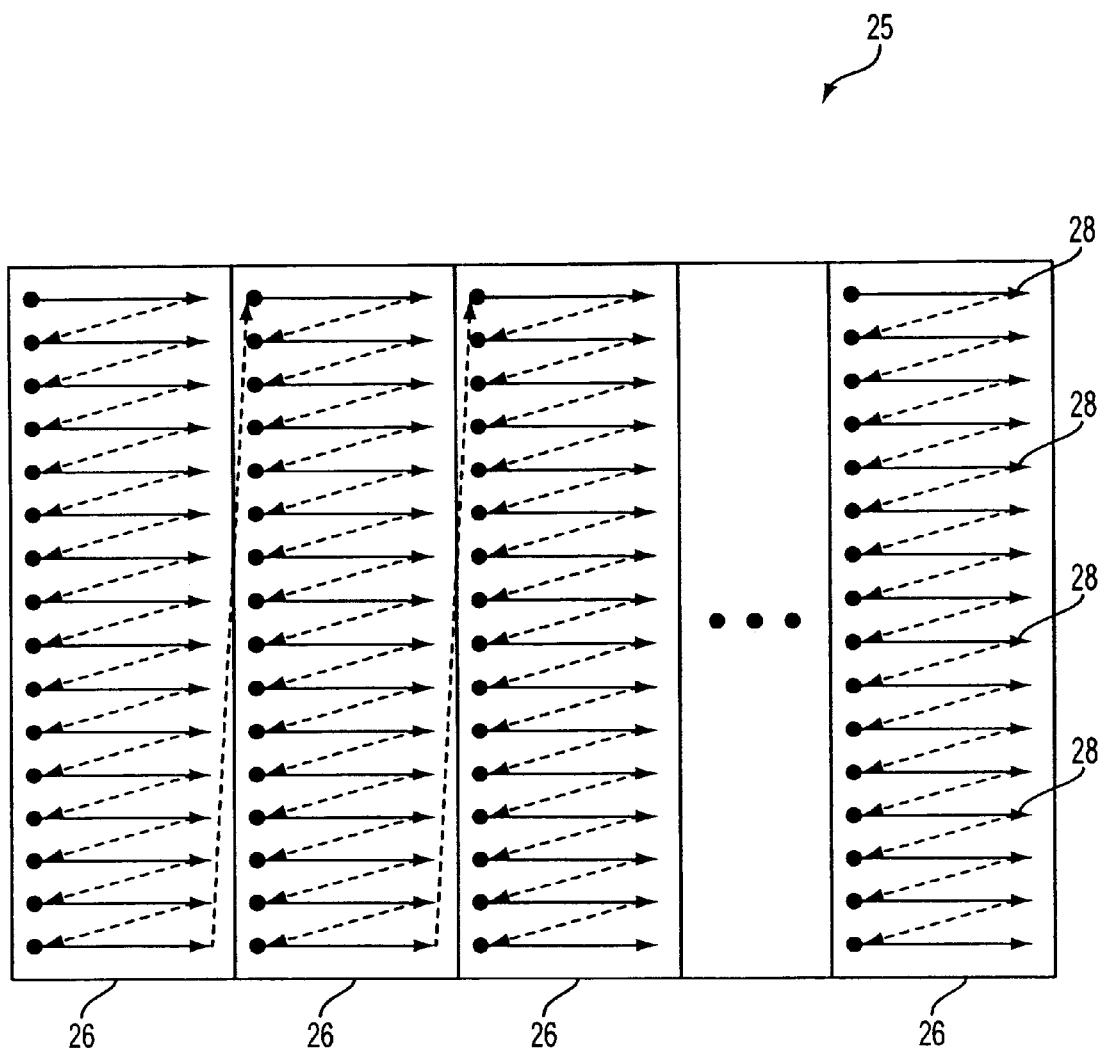
FIG. 4 illustrates a video frame in accordance with the present invention which is subdivided into a number of vertical slices for a slice scanning sequence exemplified by a corresponding number of scan lines.

FIGS. 1–3 were described in terms of the prior art. FIG. 4 illustrates a video frame 25 of the present invention subdivided into a number of vertical slices 26 for a slice scanning sequence exemplified by a corresponding number of scan lines 28. Each slice 26 is scanned in a format similar to that used in a conventional raster-scanned sequence, with the scanning sequence proceeding to the subsequent slice when the end of a given slice is reached. The advantage of this format is that the length of the line memories is reduced by a factor roughly equal to the number of vertical slices used. Line memories are still necessary, but they are now much shorter than before, resulting in a much reduced on-chip memory requirement. For instance, if the number of slices were set to 10, the reduction in on-chip memory would be by an entire order of magnitude.

However, difficulties do arise from utilizing this "slice" scan organization. First, it is often the case that processing must simultaneously be done in both the horizontal and vertical directions. This results in a problem on the left most and right most slice boundaries where horizontal pixel data outside the slice may not be available. Second, the conventional raster-scan sequencing has been changed, resulting in a potential incompatibility with common video sources and display/storage devices. Both of these problems will be addressed in the following sections as solved by the present invention.

Figure 5:
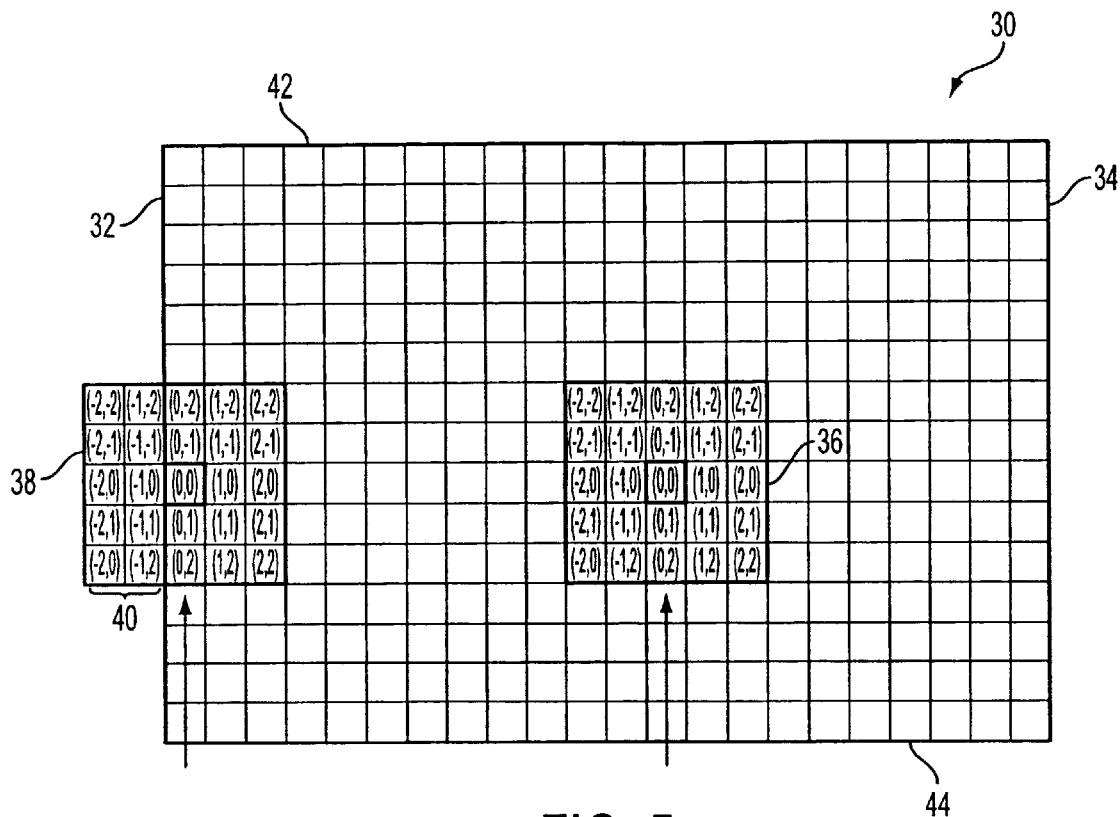
FIG. 5 illustrates an example of an initial slice core that has a problem with unavailable data on its left edge and right edge.

FIG. 5 illustrates an example of a slice core 30 that has a problem with unavailable data on its left edge 32 and right edge 34. Video processing requires that data surrounding a given pixel be available in both the horizontal and vertical directions (in this case 5×5 matrices 36 and 38 centered on the pixel). Processing matrix 36 resides in the center of the slice core 30, so there is no problem with availability of data because it is available in both horizontal and vertical directions on all sides of processing matrix 36.

It should be noted that the situation at the top edge 42 and bottom edge 44 of the slice core 30, where data above the top-most pixel and data below the bottom-most pixel is not available, is identical to that with the conventional raster-scanned format. This can be solved in a number of ways, such as substituting zero data for the nonexistent upper/lower pixel data. Therefore, the top and bottom edges 42 and 44 of the slice core will not cause problems with unavailable data. In contrast, processing matrix 38 is on the left edge 32 of the slice core 30, and is missing horizontally adjacent data. Two columns of pixel data 40 are missing because they are outside the left edge 32 of the slice core 30.

Figure 6:
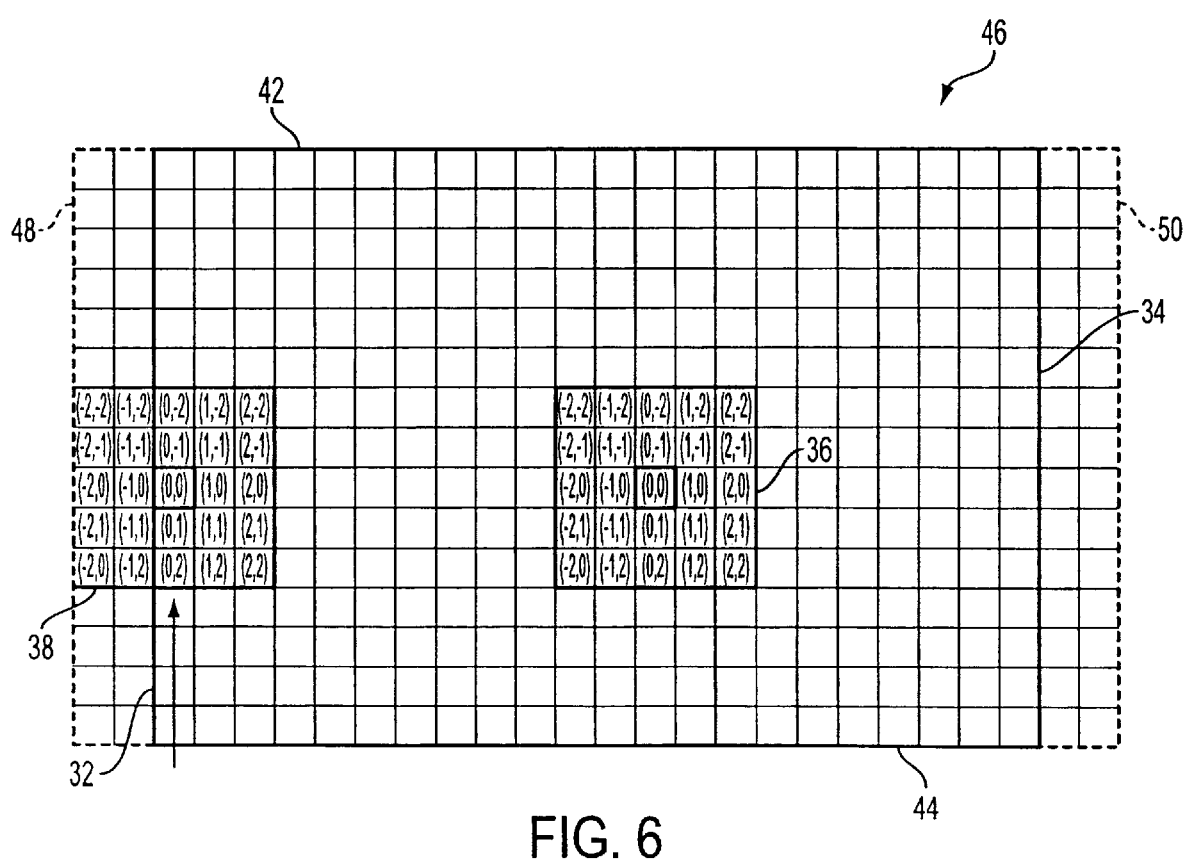
FIG. 6 illustrates a slice that has added wings along the initial slice core's left and right edges.

To resolve this situation, data for these columns are provided from the slice immediately to the left of the slice being processed. FIG. 6 illustrates a slice 46 that has added a pair of thin vertical slices or "wings" 48 and 50 along the left and right edges 32 and 34. Wing 48 must be added to the slice core 30 to provide the pixel data needed for the processing matrix. Wing 50 must be added to the right edge 34 of the slice core 30. Because wing 48 has been added to slice 46, processing matrix 38 no longer suffers from the lack of data outside of the left edge 32 of slice 46.

Figures 7A, 7B:
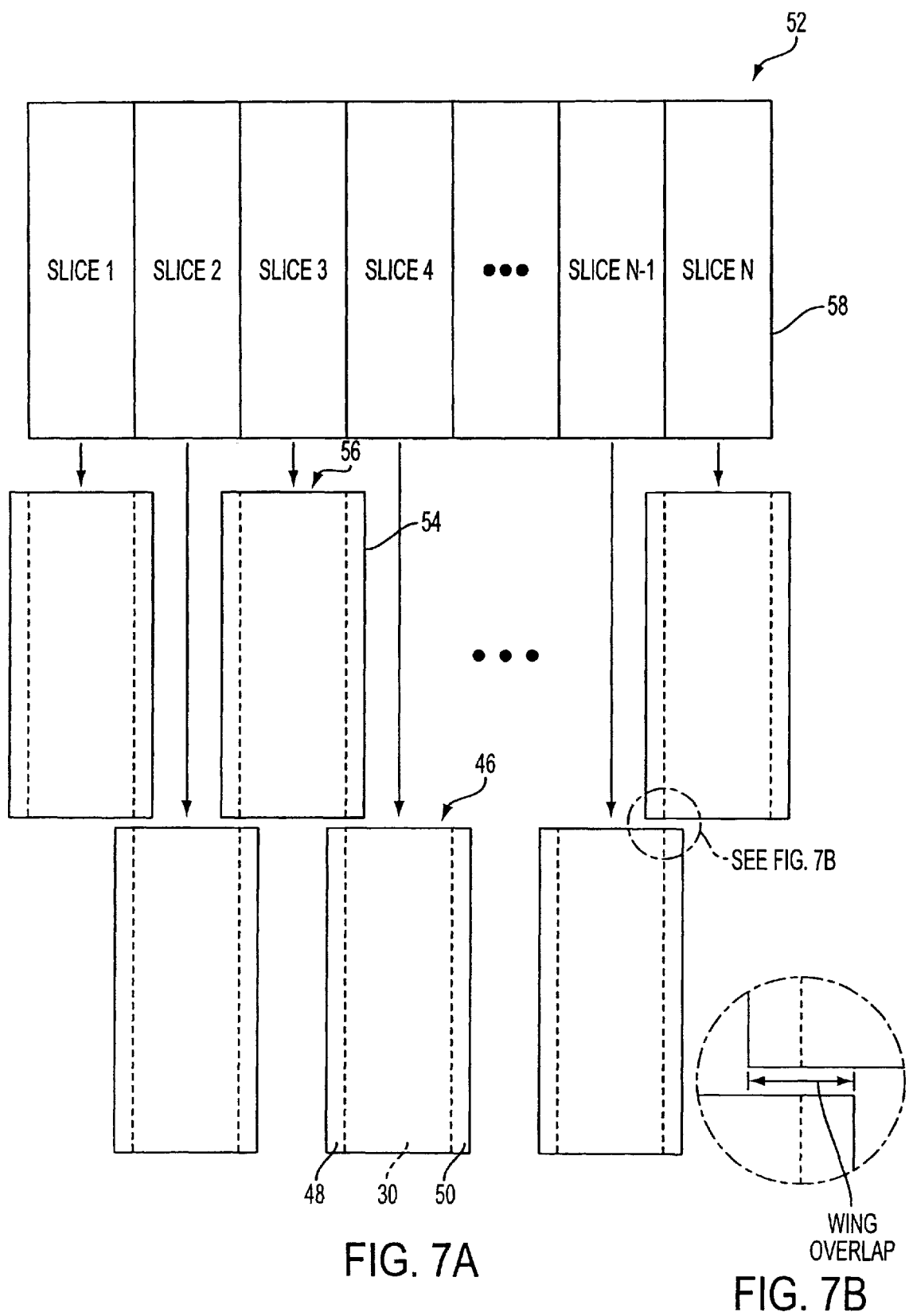
FIG. 7 illustrates an overall structure of overlapping slice/wing combinations.

FIG. 7 illustrates an overall structure of overlapping slice/wing combinations 52. Slice 46 from FIG. 6 is shown as an exemplary slice. Wings 48 and 50 of slice 46 are composed of data from a pair of adjacent slices, one to the left and one to the right of slice 46. More specifically, the missing two left columns of pixels in wing 48 are supplied from the two right most columns 54 of a slice 56 immediately to the left of slice 46. So in a sequence of slices 58, the left-most wing of slice N overlaps the core of slice N−1, while the right-most wing of slice N−1 overlaps the core of slice N.

Figure 8:
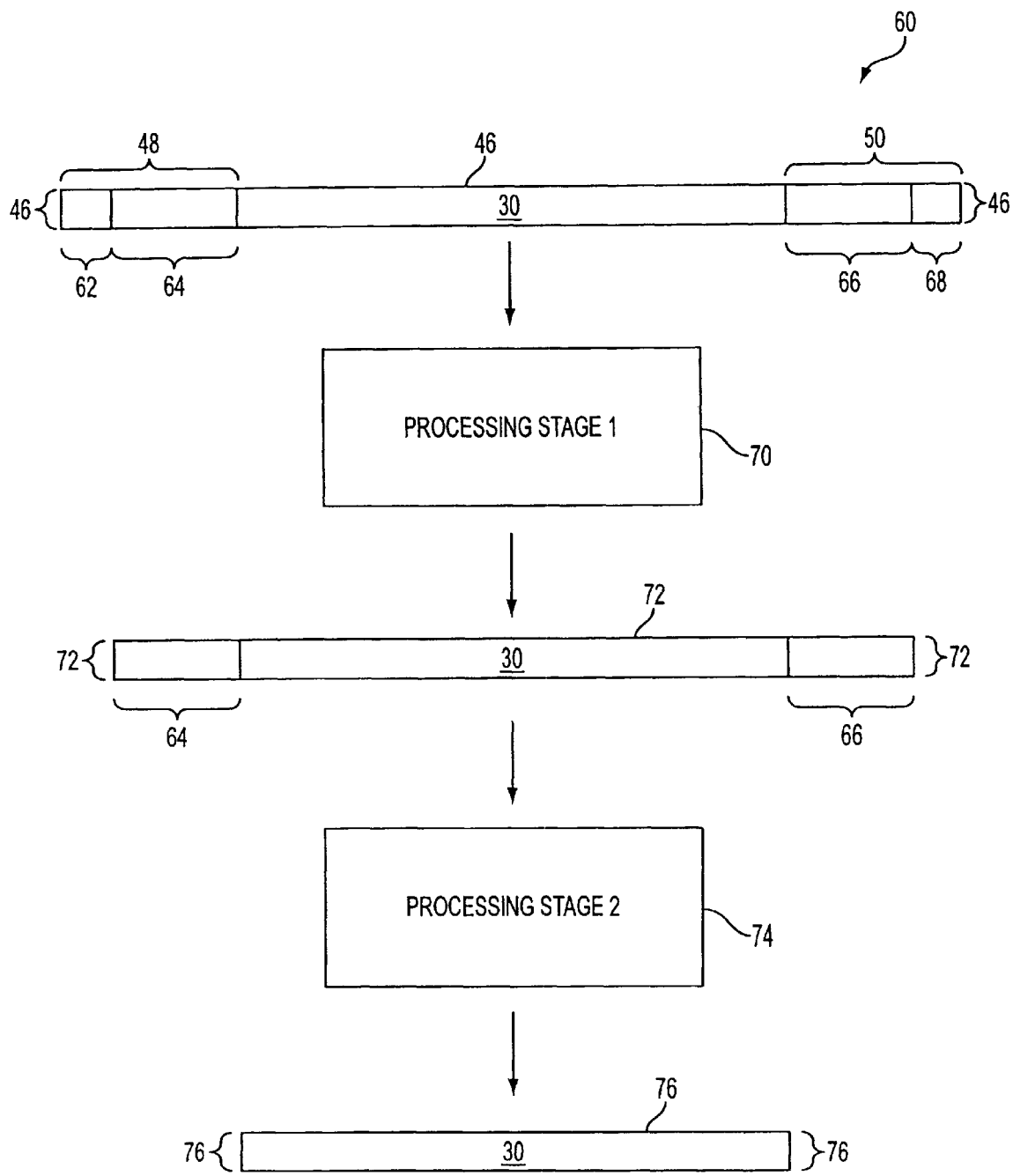
FIG. 8 is a flow chart illustrating a method of processing video in accordance with the present invention.

FIG. 8 is a flow chart illustrating a method 60 of processing video. The input to a video processing block is therefore the slice 46 with slice core 30, left wing 48 and right wings 50. The left wing 48 is divided into a left outer wing 62 and a left inner wing 64. The right wing 50 is divided into a right outer wing 68 and a right inner wing 66. In this example, the video processing block has multiple processing stages, each with its own requirement for horizontal pixels on each side of the center.

The method 60 utilizes a first processing stage 70 and a second processing stage 74. The first processing stage 70 utilizes and then removes the outer wings 62 and 68 leaving an output slice 72 consisting of the slice core 30 and the inner wings 64 and 66. The second processing stage 74 utilizes and then removes the inner wings 64 and 66. Therefore, the wings 48 and 50 are effectively removed in the processing and the output of the processing block is a slice 76 with the width equal to the original slice core 30.

One effect of the wings 48 and 50, is to increase the on-chip slice-line memory requirements by the width of the wings 48 and 50. However, the wing width is typically small relative to the overall slice width. The actual slice and wing width is implementation dependent and will depend on processing requirements and available external memory bandwidth.

A preferred embodiment of the present invention utilizes three vertical video processing blocks. The first processing stage 70 requires a pair of outer wings 62 and 68 having a width of 2 pixels; the second processing stage 74 requires a pair of inner wings 64 and 66 with a width of 4 pixels; and the third processing stage 77 requires no wings as the specific processing algorithm used does not require data horizontal to the vertical data being processed. The slice core width chosen was 36 pixels, resulting in an initial input slice width of 48 pixels. (Core+left-inner-wing+right-inner-wing+left-outer-wing+right-outer-wing=36+4+4+2+2=48.)

Unfortunately, the data inputs and outputs of the vertical processing blocks are not in the raster-scan video format, which is standard to virtually all video input sources and video output display and storage devices. The present invention includes a standardized input/output format conversion, which is accomplished via the use of a memory external to the video processing device. A commodity DRAM memory device is used for reasons of cost and availability.

Depending on the type of video processing to be done, a field or frame size buffer(s) serves other necessary purposes other than conversion between full field/frame raster-scan and slice-scan formats. For instance, the deinterlacing process typically requires one (sometimes several) field buffers to store multiple fields of video data for temporal processing. Buffers are also needed in frame rate conversion, where the output frame rate is different than the input rate; in this case multiple output field or frame buffers may be required for the frame rate conversion process.

Figure 9:
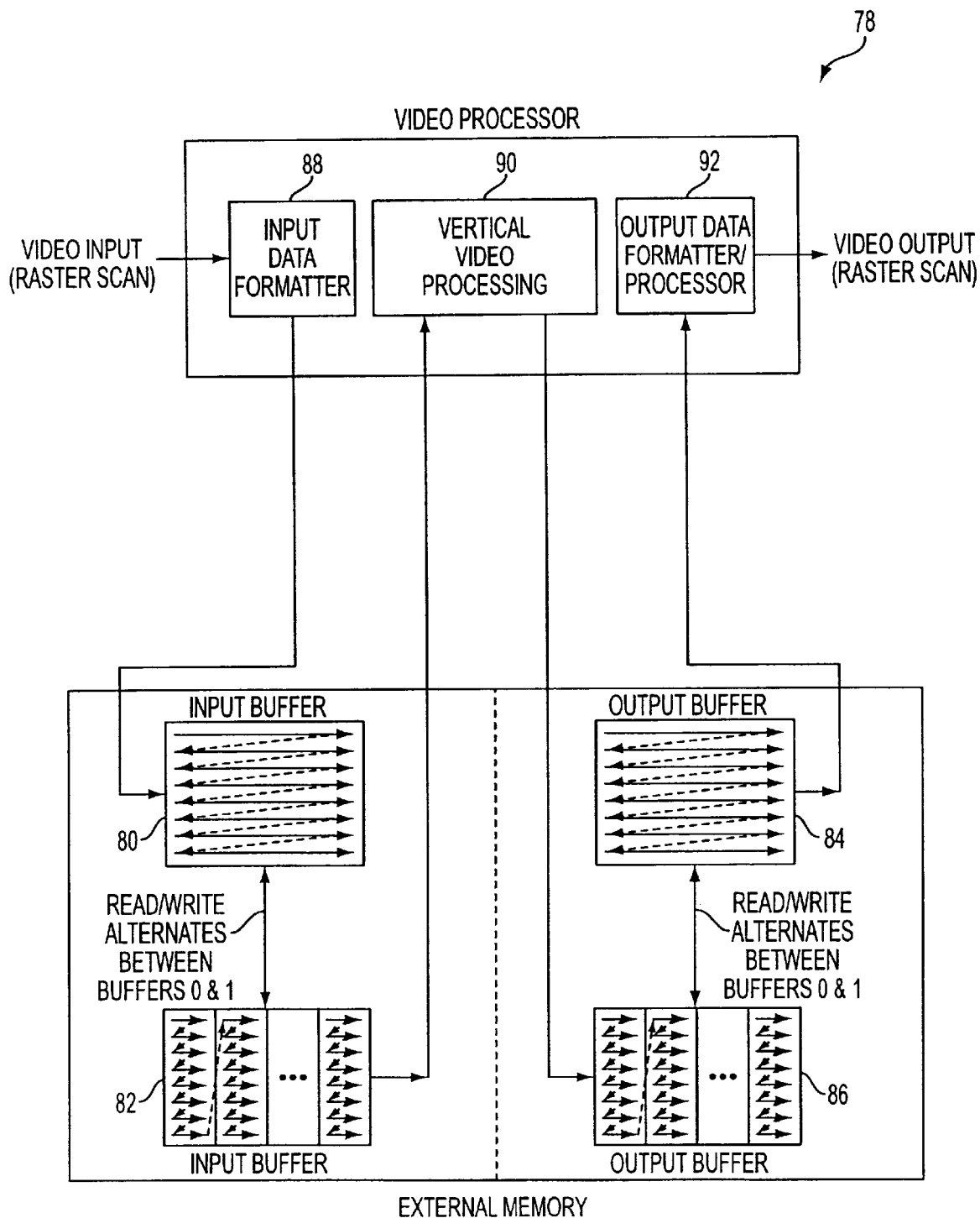
FIG. 9 illustrates a system diagram for a slice based video processor of the present invention.

FIG. 9 illustrates an example of a system diagram for a slice based video processor 78. A first input buffer 80, a second input buffer 82, a first output buffer 84 and a second output buffer 86 are utilized for the slice conversion process. Because video applications typically specify real-time input and output, and because the scanning process for a conventional raster-scan and a slice-scan are different, the first input buffer 80 is used to store the video input data stream from the input data formatter 88. The second input buffer 82 (filled in the previous field/frame period) is used to provide data to the vertical video processing section 90 in a slice-scan format.

A similar process is used for output. The second output buffer 86 receives processed data in slice-scan format from the vertical video processing section 90, while the first output buffer 84 (filled in the previous field/frame period) is used to output data in the conventional raster-scan format to the output data formatter 92. The output data stream may actually provide data to additional video processing stages that process data in the horizontal direction only (e.g. horizontal scaling and color space conversion).

Figure 10:
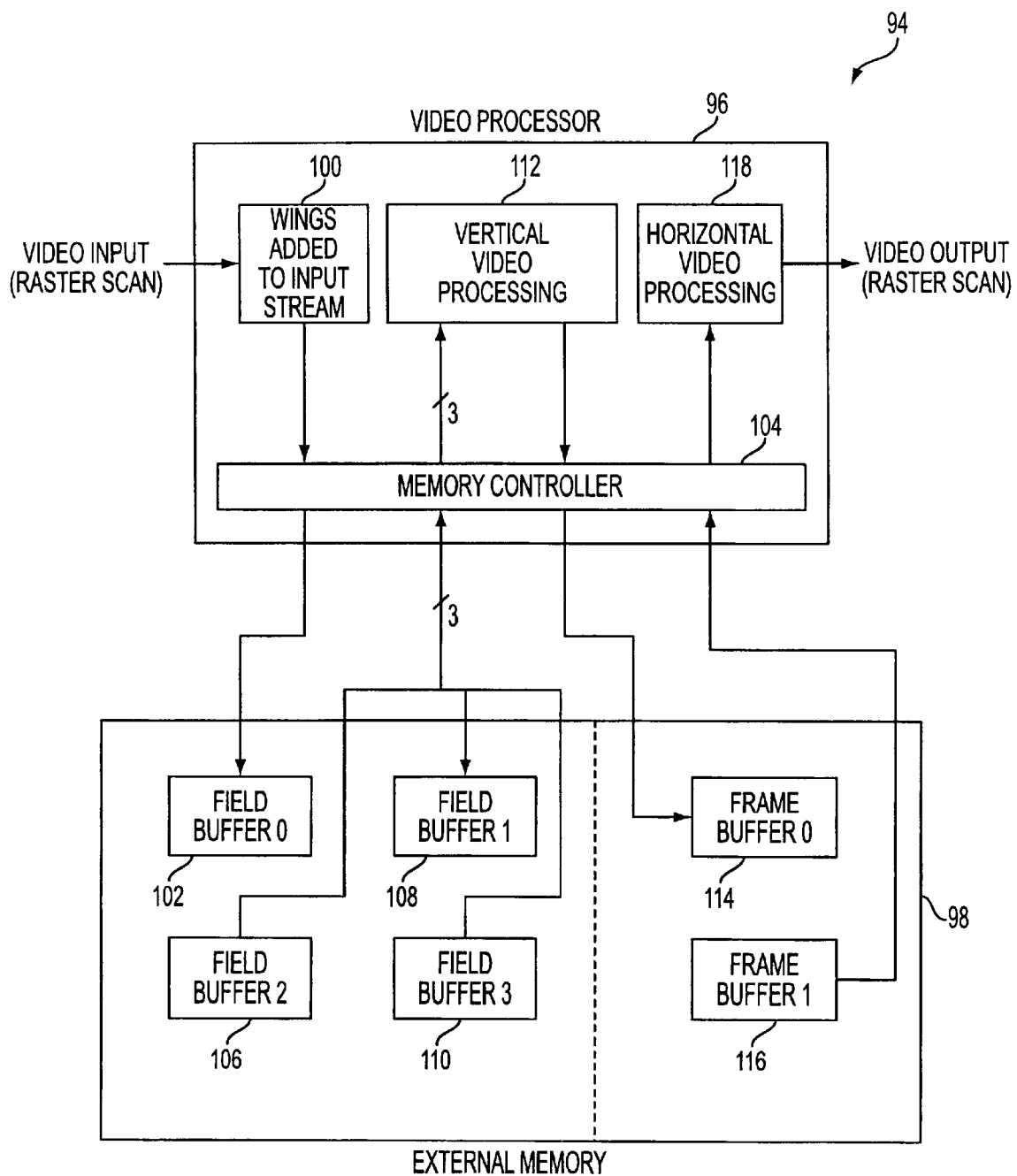
FIG. 10 illustrates a system diagram of a video processing chip architecture of the present invention.

FIG. 10 illustrates a system diagram of one example of a video processing chip architecture 94. The video processing chip architecture includes a video processor 96 and an external memory source 98. In this particular video processing implementation, multiple input field storage (for temporal processing) is required. Video data is provided to an input stage 100 in the video processor 96 that adds the redundant wing data directly into the video data stream. The data is then written (wings included) in a raster-scan sequence to a first field memory buffer 102 in the external memory source 98 by the memory controller 104 which is located inside the video processor 96. In subsequent field periods, data is written to a second field memory buffer 106, a third field memory buffer 108, and fourth 110 field memory buffers in sequence.

During the period in which data is written to the first field memory buffer 102, data is read in vertical slice scan sequence from the second, third and fourth field memory buffers 106, 108 and 110, all of which are in the external memory source. The field buffers 106, 108 and 110 feed the vertical video processing section 112 that is located inside the video processor 96. The data is processed in the vertical video processing section 112, which removes the wings.

Data is written from the vertical video processing section 112 in a slice-scan format back to a first frame buffer area 114 in the external memory source 98. Data is read from a second frame buffer area 116 in the external memory source 98 in a conventional raster-scan sequence for input to a horizontal processing block 118 located in the video processor 96. The output of the horizontal processing block 118 is in raster-scan format and is the output of the video processor 96.

In one preferred embodiment of the present invention, video input data is provided as interlaced fields of data in a 720×240 pixel field format. Each video field is conceptually broken into 20 slices of width 36 pixels, each having left and right wings of 6 pixels each (outer wings of 2 pixels each and inner wings of 4 pixels each). The wings are added at the appropriate points in the video input data stream, and the resulting data stream is written in raster-scan sequence into a first field buffer in an external SDRAM.

Three fields of data are read from the SDRAM simultaneously. The data for these fields is sourced by second, third and fourth field buffers and is read in vertical slices of 48 pixel wide (slice core and wings) by 240 rows. The data is processed by a first vertical processing stage that provides slice-scan format data at twice the input rate of a single field to a second stage. Slice data input to the second stage is formatted in slices of 44 pixels wide by 480 rows (due to the rate-doubling action of the first stage). The second vertical processing stage processes the data and provides 36 pixel wide slice-scan format data at the same rate as the input to that stage to a third vertical processing stage.

The third stage is a vertical scaler and performs no horizontal processing, and so does not require wings on the slice format data. Data is output from the third processing stage in a 36 pixel wide slice-scan format to a first frame buffer area in the SDRAM. The number of rows in each slice is dependent on the specific vertical scaling ratio chosen. Data is input to a horizontal-only processing stage in conventional raster-scan format of 720×480*M pixels, where M is the vertical scaling factor in the third vertical processing stage. This data is processed by the horizontal processor (which includes a horizontal scaler) and is output in a conventional raster-scan format at a resolution of 720*N× 480*N, where N is the horizontal scaling factor.

Overall, this implementation results in a greater than 10× reduction in on-chip memory requirements due to the slice-scan architecture. This expense saved with the reduction in on-chip memory requirements more than offsets the additional required external memory, and provides a variety of prototyping and production options.

It will therefore be appreciated that the present invention provides a method and apparatus of reducing on-chip memory requirements by processing a digital image along a vertical axis by sequencing the image in vertical slices. The invention has been described herein in terms of several preferred embodiments. Other embodiments of the invention will be apparent to those skilled in the art from consideration of the specification and practice of the invention. Furthermore, certain terminology has been used for the purposes of descriptive clarity, and not to limit the present invention. The embodiments and preferred features described above should be considered exemplary, with the invention being defined by the appended claims.

What is claimed is:

1. A digital image processor, comprising:

an input buffer storing raster-scanned data;

a slice buffer memory coupled to said input buffer to store a portion of a vertical slice of said raster-scanned data wherein the vertical slices are of a slice core and at least one pair of wings and the pair of wings each overlap the slice core of horizontally adjacent vertical slices;

a vertical slice processor having an input coupled to said slice buffer memory; and an output buffer coupled to an output of said vertical slice processor such that said vertical slices are reassembled into processed raster-scanned data in said output buffer.

2. A digital image processor as recited in claim 1, wherein the vertical slice processor processes vertical slices of the raster-scanned data along a horizontal axis.

3. A digital image processor as recited in claim 1, wherein the digital image processor processes the raster-scanned data in multiple sequential processing stages.

4. A digital image processor as recited in claim 3, wherein the multiple sequential processing stages individually process along the vertical and horizontal axis.

5. A digital image processor as recited in claim 1, wherein the digital image processor processes the raster-scanned data in multiple sequential processing stages, wherein the number of pairs of wings is equal to the number of said multiple sequential processing stages, which process along both vertical and horizontal axes.

6. A digital image processor as recited in claim 5, wherein the vertical slice processor removes an outside set of the pair of wings in one of the multiple sequential processing stages to produce an input for a next stage of the multiple sequential processing stages.

7. A digital image processor as recited in claim 5, wherein the width of the output of the vertical slice processor is equal to the width of the slice core.

8. A method of processing image data, comprising:

buffering a block of raster-scanned data in an input buffer;

sequentially retrieving and processing vertical slices of said raster-scanned data from said input buffer to form processed vertical slices wherein the vertical slices are of a slice and at least one pair of wings and the pair of wings each overlap the slice core of horizontally adjacent vertical slices; and storing said processed vertical slices in an output buffer to form a processed block of raster-scanned data.

9. A method of processing image data as recited in claim 8, including processing vertical slices of the raster-scanned data from the input buffer along a horizontal axis to form horizontally processed raster-scanned data.

10. A method of processing image data as recited in claim 8, further including removing at least one of the pair of wings.

11. A method of processing image data as recited in claim 10, wherein the width of the processed block of raster-scanned data is equal to the width of the slice core.

12. A method of processing image data, comprising:

means for buffering a block of raster-scanned data in an input buffer;

means for sequentially retrieving and processing vertical slices of said raster-scanned data from said input buffer to form processed vertical slices wherein the vertical slices are comprised of a slice core and at least one pair of wings and the pair of wings each overlap the slice core of horizontally adjacent vertical slices; and means for storing said processed vertical slices in an output buffer to form a processed block of raster-scanned data.

13. A method of processing image data as recited in claim 12, including means for processing vertical slices of the raster-scanned data from the input buffer along a horizontal axis to form horizontally processed raster-scanned data.

14. A method of processing image data as recited in claim 12, further including removing at least one of the pair of wings.

15. A method of processing image data as recited in claim 14, wherein the width of the processed block of raster-scanned data is equal to the width of the slice core.

* * * * *